US008679278B2

(12) United States Patent
Jokisch et al.

(10) Patent No.: US 8,679,278 B2
(45) Date of Patent: Mar. 25, 2014

(54) METHOD FOR CONTINUOUSLY PRODUCING MULTI-LAYERED COMPOSITE BODIES

(75) Inventors: Carl Jokisch, Mannheim (DE); Juergen Weiser, Schriesheim (DE)

(73) Assignee: BASF SE, Ludwigshafen (DE)

( * ) Notice: Subject to any disclaimer, the term of this patent is extended or adjusted under 35 U.S.C. 154(b) by 228 days.

(21) Appl. No.: 13/054,378

(22) PCT Filed: Jul. 14, 2009

(86) PCT No.: PCT/EP2009/058950
§ 371 (c)(1),
(2), (4) Date: Jan. 14, 2011

(87) PCT Pub. No.: WO2010/007042
PCT Pub. Date: Jan. 21, 2010

(65) Prior Publication Data
US 2011/0120635 A1    May 26, 2011

(30) Foreign Application Priority Data

Jul. 17, 2008  (EP) .................................. 08160655

(51) Int. Cl.
*B32B 37/02*   (2006.01)
*B32B 37/06*   (2006.01)
*B32B 37/12*   (2006.01)
*B32B 37/14*   (2006.01)
*B32B 38/00*   (2006.01)

(52) U.S. Cl.
USPC .......................................... 156/242; 156/500

(58) Field of Classification Search
USPC ........................................................ 156/242
See application file for complete search history.

(56) References Cited

U.S. PATENT DOCUMENTS

| 4,129,611 | A | * | 12/1978 | Heiss ....................... 525/440.12 |
| 4,751,116 | A | * | 6/1988 | Schaefer et al. ................. 428/15 |
| 6,093,013 | A | * | 7/2000 | Sagrati, Jr. et al. ............ 425/470 |
| 2004/0240914 | A1 | * | 12/2004 | Takenaka et al. ............. 399/328 |
| 2007/0082176 | A1 | * | 4/2007 | Schaefer ....................... 428/151 |
| 2008/0224356 | A1 | | 9/2008 | Taeger et al. |
| 2010/0092726 | A1 | | 4/2010 | Schuette et al. |
| 2010/0119775 | A1 | | 5/2010 | Bustos et al. |
| 2010/0310822 | A1 | * | 12/2010 | Jokisch et al. ................. 428/138 |
| 2010/0316833 | A1 | | 12/2010 | Jokisch et al. |
| 2010/0316834 | A1 | | 12/2010 | Jokisch et al. |
| 2010/0330356 | A1 | | 12/2010 | Jokisch et al. |

FOREIGN PATENT DOCUMENTS

| DE | 237 082 | 7/1986 |
| DE | 20 2004 014 107 | 1/2005 |
| DE | 20 2008 002 503 | 5/2008 |
| DE | 20 2008 00490 | 7/2008 |
| EP | 0 084 851 | 8/1983 |
| EP | 1 882 610 | 1/2008 |
| WO | 2004 092299 | 10/2004 |
| WO | 2005 047549 | 5/2005 |
| WO | 2009 106497 | 9/2009 |
| WO | 2009 106501 | 9/2009 |
| WO | WO 2009/106497 A1 | 9/2009 |
| WO | WO 2009/106501 A1 | 9/2009 |

OTHER PUBLICATIONS

International Search Report issued Aug. 31, 2009 in PCT/EP2009/058950 filed Jul. 14, 2009.
U.S. Appl No. 13/123,782, filed Apr. 12, 2011, Jokisch, et al.

* cited by examiner

*Primary Examiner* — Philip Tucker
*Assistant Examiner* — Vicki Wu
(74) *Attorney, Agent, or Firm* — Oblon, Spivak, McClelland, Maier & Neustadt, L.L.P.

(57) ABSTRACT

Method for continuously producing multi-layered composite bodies
A process for continuous production of multilayered composite articles which comprise
  (A) at least one backing material,
  (B) least one bonding layer, and
  (C) at least one polyurethane layer which includes capillaries which pass through the entire thickness of the polyurethane layer,
comprises using a mold to produce polyurethane layer (C) and fixing said polyurethane layer (C) on said backing material (A) with the aid of a material which converts to said bonding layer (B), the mold having a temperature in the range from 80 to 170° C and a heat capacity in the range from 100 to 20 000 J/K·m$^2$.

17 Claims, No Drawings

METHOD FOR CONTINUOUSLY PRODUCING MULTI-LAYERED COMPOSITE BODIES

The present invention relates to a process for continuous production of multilayered composite articles which comprise
(A) at least one backing material,
(B) at least one bonding layer, and
(C) at least one polyurethane layer which includes capillaries which pass through the entire thickness of the polyurethane layer,
said process comprising using a mold to produce polyurethane layer (C) and fixing said polyurethane layer (C) on said backing material (A) with the aid of a material which converts to said bonding layer (B), the mold having a temperature in the range from 80 to 170° C. and comprising a heat transfer medium having a heat capacity in the range from 100 to 20 000 J/K.m².

Multilayered composite articles, for example coated leather, coated textile or coated cellulosic products, are enjoying growing popularity. Especially polyurethane-coated composite articles as described in WO 2005/047549 for example have a combination of numerous diverse properties and therefore a wide field of possible uses. They combine the mechanical properties of leather with breathability, an appealing appearance and a pleasant feel or hand (haptics).

Yet to date there is a shortage of processes for producing such composite articles cost-effectively. Prior art processes generally operate piecewise or batchwise and necessitate a high input of manual labor.

It is an object of the present invention to provide a process whereby multilayered composite articles can be produced cost-effectively.

We have found that this object is achieved by the process defined at the beginning.

Composite articles produced according to the present invention are breathable in one embodiment of the present invention. In another embodiment of the present invention, composite articles produced according to the present invention are not breathable.

Composite articles produced according to the invention comprise
(A) at least one backing material.

Backing material (A) may be any of a wide variety of materials, examples being textile, cellulosic materials such as paper and paperboard and preferably leather, hereinafter also referred to respectively as textile (A), cellulosic material (A) and leather (A). But artificial leather, foils, especially metallic or polymeric foils, and polyurethane are also suitable, especially thermoplastic polyurethane, for example as a foam. Backing material (A) is not breathable in one embodiment. In a preferred embodiment of the present invention, backing material (A) is selected from breathable materials.

Textile (A) or textiles (A) may have various manifestations. Suitable are for example wovens, felt, knits, waddings, laid scrims and microfiber fabrics, and also non-wovens.

Textile (A) preferably comprises non-wovens, wovens or knits.

Textile (A) may be selected from lines, cords, ropes, yarns or threads. Textile (A) may be of natural origin, for example cotton, wool or flax, or synthetic, for example polyamide, polyester, modified polyesters, polyester blend fabrics, polyamide blend fabrics, polyacrylonitrile, triacetate, acetate, polycarbonate, polyolefins such as for example polyethylene and polypropylene, polyvinyl chloride, also polyester microfibers and glass fiber fabrics. Very particular preference is given to polyester, cotton and polyolefins such as for example polyethylene and polypropylene and also selected blend fabrics selected from cotton-polyester blend fabrics, polyolefin-polyester blend fabrics and polyolefin-cotton blend fabrics.

Textile (A) may be untreated or treated, for example bleached or dyed. Preferably, textile (A) is coated on one side only or uncoated.

Textile (A) may be finished; in particular textile (A) has an easy care and/or flameproof finish.

Textile (A) may have an areal weight in the range from 10 to 500 g/m², preference being given to 50 to 300 g/cm².

Cellulosic material (A) may comprise various species of cellulosic materials. Cellulosic in the context of the present invention includes hemicellulosic and lignocellulosic.

Cellulosic material (A) may comprise wood or chipboard. Wood may comprise for example lacquered or unlacquered wood, and wood for the purposes of the present invention may have been rendered biocidal. Veneer also counts as wood for the purposes of the present invention.

In one embodiment of the present invention, cellulosic material (A) may comprise wood plastic composite (WPC).

Cellulosic material (A) may preferably comprise paperboard, cardboard or paper. Paper for the purposes of the present application may be uncoated or preferably coated or conventionally finished. More particularly, paper may comprise bleached paper. Paper may comprise one or more pigments, for example chalk, kaolin or $TiO_2$, and paper, paperboard or cardboard may be undyed (ecru in color) or colored. Paper, paperboard and cardboard for the purposes of the present applications may be printed or unprinted.

In one embodiment of the present invention, paper (A) may comprise kraft paper.

In one embodiment of the present invention, paper (A) may comprise paper finished with polyacrylate dispersion.

In one embodiment of the present invention, backing material (A) may comprise plastics or metallic foils, foils (A) for short.

Foils (A) for the purposes of the present invention comprise sheetlike structures composed of metal or of a natural or preferably synthetic polymer, which can have a thickness of 0.5 µm to 1 mm, preferably 1 µm to 0.5 mm and more preferably up to 0.15 mm. Plastics and metallic foils (A) herein are also subsumed under the term foils (A).

Foil (A) is preferably bendable by hand, i.e., without aid of a tool.

Metals are preferably silver, gold, iron, copper, tin and particularly aluminum.

Polymers are preferably polyolefins such as polyethylene and polypropylene, polyester, polyamide, polycarbonate, polyvinyl chloride, polymethyl methacrylate and polystyrene, the reference to polyolefins such as polyethylene and polypropylene being understood to refer to copolymers of ethylene and propylene with other olefins such as for example acrylic acid or 1-olefins as well as ethylene homopolymers and propylene homopolymers. Polyethylene for instance is to be understood as meaning in particular ethylene copolymers with 0.1% to below 50% by weight of one or more 1-olefins such as propylene, 1-butene, 1-pentene, 1-hexene, 1-octene, 1-decene or 1-dodecene, of which propylene, 1-butene and 1-hexene are preferred. Polypropylene is to be understood as meaning in particular propylene copolymers with 0.1% to below 50% by weight of ethylene and/or of one or more 1-olefins such as 1-butene, 1-pentene, 1-hexene, 1-octene, 1-decene or 1-dodecene, of which ethylene, 1-butene and 1-hexene are preferred. Polypropylene is preferably to be understood as meaning essentially isotactic polypropylene.

Foils of polyethylene can be made of HDPE or LDPE or LLDPE. Foils of polyamide are preferably derived from nylon-6.

Foils of polyester are preferably those of polybutylene terephthalate and particularly polyethylene terephthalate (PET).

Foils of polycarbonates are preferably derived from polycarbonates obtained using bisphenol A.

Foils of polyvinyl chloride are foils made of plasticized polyvinyl chloride and unplasticized polyvinyl chloride, with plasticized polyvinyl chloride also comprising copolymers of vinyl chloride with vinyl acetate and/or acrylates.

Foils of polyurethane are preferably foils of thermoplastic polyurethane, so-called TPU foils.

Foils (A) can also comprise laminated foils, for example foils comprising one of the aforementioned foils and a metal foil or paper In one embodiment of the present invention, backing material (A) comprises leather. Leather herein comprises tanned animal hides, which may be finished or preferably nonfinished. Tanning may be according to a wide variety of methods, for example with chrome tannins, other mineral tannins such as for example aluminum compounds or zirconium compounds, with polymeric tannins, for example homo- or copolymers of (meth)acrylic acid, with aldehydes, in particular with glutaraldehyde, with synthetic tannins such as for example condensation products of aromatic sulfonic acids with aldehydes, in particular formaldehyde, or with other carbonyl-containing compounds such as for example condensation products of aromatic sulfonic acids with urea. Further suitable leathers are leathers tanned with vegetable tannins and/or enzymatically. Leathers tanned with a mixture of two or more of the aforementioned tannins are also suitable.

Leather herein may further have undergone one or more of the operations known per se, examples being hydrophobicization, fatliquoring, retanning and dyeing.

Leather (A) may be obtained for example from hides of cattle, hogs, goats, sheep, fish, snakes, wild animals or birds.

Leather (A) may have a thickness in the range from 0.2 to 2 mm. Leather (A) preferably comprises grain leather. Leather can be free of raw hide defects, but such leather which includes raw hide defects, caused for example by injuries due to barbed wire, fights between animals or insect bites, is also suitable.

In one embodiment of the present invention, leather (A) comprises split leather, or split.

In one embodiment of the present invention, leather (A) comprises suede leather or split suede.

In one embodiment of the present invention, backing (A) comprises artificial leather, short artificial leather (A). Artificial leather herein also comprises precursors to artificial leather, specifically those where the uppermost layer, i.e., a or the top layer, is missing.

Artificial leather (A) herein comprises plastic-coated preferably textile sheetlike bodies with or without top layer, the top layer, if present, having a leatherlike appearance. Examples of artificial leather (A) are artificial leather based on woven fabric, artificial leather based on nonwoven fabric, artificial leather based on fiber, artificial leather based on foil and artificial leather based on foam. The term artificial leather (A) also covers articles having two top layers such as, for example, artificial leather based on nonwoven fabric. Particularly preferred artificial leathers (A) are breathable artificial leathers based on polyurethane, as described for example in Harro Träubel, New Materials Permeable to Water Vapor, Springer Verlag 1999. Preference is further given to backing materials wherein an open-cell polyurethane foam is applied to a textile backing, for example as a beaten foam or by direct in-situ foaming.

In one embodiment of the present invention, backing material (A) is selected from leather, artificial leather, metallic or plastics foils, textile and cellulosic materials.

In one embodiment of the present invention, backing material (A) comprises backing material taken at the start of the production process of the present invention from reservoirs, for example from stacks or, in particular, continuously from one or more rolls.

Composite articles produced according to the present invention further include at least one bonding layer (B). Bonding layer (B) may comprise an interrupted, i.e., nonuniformly applied, layer, or a uniformly applied layer. Bonding layer (B) preferably comprises a layer of a cured organic adhesive. Bonding layer (B) is formed by a material which converts to bonding layer (B).

In one embodiment of the present invention, bonding layer (B) comprises a layer applied in point form, stripe form or lattice form, for example in the form of diamonds, rectangles, squares or a honeycomb structure. In that case, polyurethane layer (C) comes into contact with backing material (A) in the gaps of the bonding layer (B).

In one embodiment of the present invention, bonding layer (B) comprises a layer of a cured organic adhesive, for example based on polyvinyl acetate, polyacrylate or in particular polyurethane, preferably based on polyurethanes having a glass transition temperature below 0° C.

The organic adhesive may for example be cured thermally, through actinic radiation or by aging.

In another embodiment of the present invention, bonding layer (B) comprises an adhesive gauze.

In one embodiment of the present invention, bonding layer (B) has a maximum thickness of 100 µm, preferably 50 µm, more preferably 30 µm, most preferably 15 µm.

In an embodiment of the present invention, bonding layer (B) may comprise microballoons. Microballoons herein are spherical particles having an average diameter in the range from 5 to 20 µm and composed of polymeric material, in particular of halogenated polymer such as for example polyvinyl chloride or polyvinylidene chloride or copolymer of vinyl chloride with vinylidene chloride. Microballoons may be empty or preferably filled with a substance whose boiling point is slightly lower than room temperature, for example with n-butane and in particular with isobutane. In one variant of the present invention, microballoons are filled with isopentane.

In one embodiment of the present invention, polyurethane layer (C) may be bonded to backing material (A) via at least two bonding layers (B) having the same or a different composition. One bonding layer (B) may comprise a pigment with the other bonding layer (B) being pigment free.

In one variant, one bonding layer (B) may comprise microballoons with the other bonding layer (B) not comprising microballoons.

The process of the present invention for continuous production of multilayered composite materials, herein also referred to as inventive process, will now be more particularly described.

The inventive process may be carried out using diverse apparatus permitting continuous processing of composite articles and permitting the implementation of various operations at different locations of the apparatus in question.

The inventive process comprises using a mold to produce polyurethane layer (C) and fixing said polyurethane layer (C) on the backing material with the aid of a material which converts to bonding layer (B), the mold having a temperature in the range from 80 to 170° C. and comprising a heat transfer medium having a heat capacity in the range from 100 to 20 000 J/K.m². The fixing and/or the applying of material which converts to bonding layer (B) is preferably effected continuously. It is particularly preferable for both the two last-mentioned steps to be effected continuously.

Polyurethane layer (C) may be prepared with the aid of at least one formulation of at least one polyurethane. Formulations are preferably aqueous emulsions, dispersions or solutions, but solutions or dispersions in sufficiently volatile organic solvents are also suitable. Preference is given to formulations in an incombustible medium, in particular in water.

The mold has a temperature in the range from 80 to 170° C., preferably 85 to 130 and more preferably to 110° C. The temperature in question comprises in each case the surface temperature at the start of the application of polyurethane film (C). Preferably, the surface temperature at the end of the curing of polyurethane to polyurethane layer (C) is also in the range above 60° C.

The mold has a heat capacity in the range from 100 to 20 000 J/K.m², preferably 500 to 15 000 J/K.m². The square meters each relate to the surface area of the mold. The heat capacity is the amount of heat required to raise the surface temperature of one square meter of mold by one kelvin.

In one embodiment of the present invention, the mold additionally comprises a heat transfer medium. The heat transfer medium or media is or are capable of maintaining a sufficiently high temperature on the part of the mold, so that water and/or organic solvent or solvents evaporate sufficiently rapidly while polyurethane layer (C) is produced. In those embodiments in which the mold comprises a heat transfer medium, the heat capacity values are based on the combination of actual mold and heat transfer medium.

For example, the heat transfer medium may comprise a heated or heatable metallic body, for example in the form of a strip or in the form of one or more plates or bars, which can be connected to each other, or in the form of a grid or in the form of connected rings in the manner of chain mail. Heated metallic bodies can be heated for example with electric current, with steam having a temperature above 110° C. or preferably with superheated steam, i.e., steam having a temperature in the range from 300 to 400° C. Such heated metallic bodies can be continuously heated or semicontinuously, i.e., heating medium is supplied when the temperature drops below a certain minimum temperature, and after the exceedance of a certain maximum temperature the supply of heating medium is interrupted again.

In another embodiment of the present invention, heat transfer media are selected from metallic bodies having high heat capacity, in particular in the range from 100 to 20 000 J/K.m², for example metallic plates. Such metallic plates are heated at one location of the apparatus used for carrying out the inventive process, and used at another location for producing polyurethane film (C).

In another embodiment of the present invention, the heat transfer medium comprises metal integrated in a mold. Examples are metallic foils, flexible metallic grids in the form of a metallic network, also metallic rods, honeycombs or metallic wool, preference being given to heatable metallic wires.

In one embodiment of the present invention, the heat transfer medium comprises an electrically heated wire or a combination of electrically heated wires which respectively is and are integrated in the actual mold. The combination of electrically heated wires may comprise a plurality of coils for example.

In another embodiment of the present invention, the mold comprises a silicone mold having a particularly high thickness, for example in the range from 0.5 cm to 2 cm, preferably to 1 cm. Such thick molds and in particular such thick silicone molds themselves have a particularly high heat capacity and are heat transfer media in the embodiment in question.

In another embodiment of the present invention, the mold comprises a silicone-coated material, for example metal, in particular steel or aluminum.

In one embodiment of the present invention, the mold comprises a mold, in particular silicone mold, having a particularly high thickness, the mold in question and in particular the silicone mold in question being doped with at least one material itself having a high heat capacity, examples being graphite, oils, waxes, in particular paraffin waxes, and latent heat storage media, in particular encapsulated latent heat storage media as disclosed in WO 2004/092299 for example.

One embodiment of the present invention utilizes a silicone mold which is continuously or discontinuously heated with microwaves during the practice of the process.

In another embodiment of the present invention, the mold is configured as an endless strip which travels via rollers along various machinery parts where the operations in question are carried out. Suitable machinery parts include for example spray nozzles, spray guns, calenders, semicontinuous presses and, in particular, roller presses, also light sources, heaters and dryers such as for example ovens or ventilators.

In another embodiment of the present invention, the mold is configured as a mold mounted on a metal roll or metal drum, "seamlessly", i.e. with a very small seam between the beginning and the end of the mold. This makes it possible to use the entire length of the mold.

In one embodiment of the present invention, the mold comprises a mold comprising a heat transfer medium having a heat capacity in the range from 100 to 20 000 J/K m². One embodiment of the inventive production process proceeds by forming a polyurethane layer (C) with the aid of a mold, applying at least one organic adhesive uniformly or partially onto backing material (A) and/or onto polyurethane layer (C) and then bonding polyurethane layer (C) pointwise, stripewise or areawise to said backing material (A). The heat transfer medium comprised by the mold ensures that the mold has a sufficiently high temperature during the entire period in which organic adhesive is applied to polyurethane layer (C).

One embodiment of the inventive production process comprises first providing a polyurethane film (C), coating at lest a backing material (A) or the polyurethane film (C) or both with organic adhesive on one face in each case, partially, for example in the form of pattern, for example by brushing or spraying, and then bringing the two faces into contact with each other. Thereafter, the system thus obtainable can additionally be pressed together or thermally treated or pressed together while being heated. A system of counter-rotating rollers can be used for the pressing together for example.

Polyurethane film (C) forms the later polyurethane layer (C) of the multilayered composite material produced according to the present invention. Polyurethane film (C) can be produced as follows:

A preferably aqueous polyurethane dispersion is applied to a mold which is preheated by means of heat transfer medium, aqueous phase, preferably the water, is allowed to evaporate and then the resulting polyurethane film (C) is transferred to backing material (A).

The application of preferably aqueous polyurethane dispersion to the mold can be carried out by conventional methods, in particular by continuous spraying, for example with a spray gun.

The mold can have a smooth or flat surface, but preferably it is structured.

The structuring on the mold can be produced for example by laser engraving or by molding with a negative mold. The structuring can correspond to a pattern for example. It is particularly preferable for the structuring to correspond to the negative of a grain pattern of leather or to the negative of a nubuck. Other particularly preferred structurings correspond to surfaces of wood, technical surfaces such as for example a carbon look, including 3D effects. The structurings, in addition to the actual structuring, may also comprise imagewise designs, monograms, family crests or one or more company logos.

One embodiment of the present invention comprises providing a mold which includes an elastomeric layer or a layered composite comprising an elastomeric layer on a backing, the elastomeric layer comprising a binder and also, if appropriate, further, additive and auxiliary materials. Providing the mold can then comprise the following steps:
1) applying a liquid binder, comprising additive and/or auxiliary materials if appropriate, to a patterned surface, for example another mold or an original pattern,
2) curing the binder, for example by thermocuring, radiative curing or by allowing to age,
3) separating the structured medium thus obtainable and if appropriate applying it to a backing, for example a metal plate or a metal cylinder,
4) optionally bonding a plurality of comparatively small molds thus obtainable to form a comparatively large mold, in particular a silicone strip.

One embodiment of the present invention proceeds by a liquid silicone being applied to a pattern, the silicone being allowed to age and thus cure to a silicone foil and then stripping. The silicone foil is then adhered to a backing, for example a metallic plate, a metallic cylinder or a metallic foil.

In one embodiment of the present invention, the mold comprises a mold comprising a heat transfer medium having a heat capacity in the range from 100 to 20 000 $J/K.m^2$, particular preference being given to a silicone mold.

A preferred embodiment of the present invention provides a mold which includes a laser-engravable layer or a layered composite comprising a laser-engravable layer on a backing, the laser-engravable layer comprising a binder and also, if appropriate, further, additive and auxiliary materials. The laser-engravable layer is preferably also elastomeric.

In a preferred embodiment, the providing of a mold comprises the steps of:
1) providing a laser-engravable layer or a layered composite comprising a laser-engravable layer on a backing, the laser-engravable layer comprising a layer and also, preferably, additive and auxiliary materials,
2) thermochemical, photochemical or actinic amplification of the laser-engravable layer,
3) engraving into the laser-engravable layers, using a laser, a surface structure corresponding to the surface structure of the surface-structured coating,
4) optional seamless connecting of the ends of the laser-engraved layer.

Instead of connecting the ends of the laser-engraved layer to each other, it is also possible to carry out an alternative step 4a) whereby a plurality of molds, or pieces of molds, are joined together to form a large mold.

The laser-engravable layer, which is preferably elastomeric, or the layer composite can be and preferably are present on a support. Examples of suitable supports comprise woven fabrics and self-supporting films/sheets of polyethylene terephthalate (PET), polyethylene naphthalate (PEN), polybutylene terephthalate (PBT), polyethylene, polypropylene, polyamide or polycarbonate, preferably PET or PEN self-supporting films/sheets. Suitable supports likewise include papers and formed-loop knits, for example of cellulose. As supports there may also be used conical or cylindrical sleeves of the materials mentioned. Also suitable for sleeves are glass fiber fabrics or composite materials comprising glass fibers and polymeric materials of construction. Suitable support materials further include metallic supports such as for example solid or fabric-shaped, sheetlike or cylindrical supports of aluminum, steel, magnetizable spring steel or other iron alloys.

In one embodiment of the present invention, the support may be coated with an adhesion-promoting layer to provide better adhesion of the laser-engravable layer. Another embodiment of the present invention requires no adhesion-promoting layer.

The laser-engravable layer comprises at least one binder, which may be a prepolymer which reacts in the course of a thermochemical amplification to form a polymer. Suitable binders can be selected according to the properties desired for the laser-engravable layer or the mold, for example with regard to hardness, elasticity or flexibility. Examples of suitable binders can essentially be divided into 3 groups, without there being any intention to limit the binders thereto.

The first group comprises those binders which have ethylenically unsaturated groups. Ethylenically unsaturated groups are crosslinkable photochemically, thermochemically, by means of electron beams or by means of any desired combination thereof. In addition, mechanical amplification is possible by means of fillers. Such binders are for example those comprising 1,3-diene monomers such as isoprene or 1,3-butadiene in polymerized form. The ethylenically unsaturated group may either function as a chain building block of the polymer (1,4-incorporation), or it may be bonded to the polymer chain as a side group (1,2-incorporation). As examples there may be mentioned natural rubber, polybutadiene, polyisoprene, styrene-butadiene rubber, nitrile-butadiene rubber, acrylonitrile-butadiene-styrene (ABS) copolymer, butyl rubber, styrene-isoprene rubber, polychloroprene, polynorbornene rubber, ethylene-propylene-diene monomer (EPDM) rubber or polyurethane elastomers having ethylenically unsaturated groups.

Further examples comprise thermoplastic elastomeric block copolymers of alkenyl-aromatics and 1,3-dienes. The block copolymers may comprise either linear block copolymers or else radial block copolymers. Typically they are three-block copolymers of the A-B-A type, but they may also comprise two-block polymers of the A-B type, or those having a plurality of alternating elastomeric and thermoplastic blocks, for example A-B-A-B-A. Mixtures of two or more different block copolymers can also be used. Commercially available three-block copolymers frequently comprise certain proportions of two-block copolymers. Diene units may be 1,2- or 1,4-linked. Block copolymers of the styrene-butadiene type and also of the styrene-isoprene type can be used. They are commercially available under the name Kraton® for example. It is also possible to use thermoplastic elastomeric block copolymers having end blocks of styrene and a random styrene-butadiene middle block, which are available under the name Styroflex®.

Further examples of binders having ethylenically unsaturated groups comprise modified binders in which crosslinkable groups are introduced into the polymeric molecule through grafting reactions.

The second group comprises those binders which have functional groups. The functional groups are crosslinkable thermochemically, by means of electron beams, photochemically or by means of any desired combination thereof. In addition, mechanical amplification is possible by means of fillers. Examples of suitable functional groups comprise —Si(HR$^1$)O—, —Si(R$^1$R$^2$)O—, —OH, —NH$_2$, —NHR$^1$, —COOH, —COOR$^1$, —COHN$_2$, —O—C(O)NHR$^1$, —SO$_3$H or —CO—. Examples of binders comprise silicone elastomers, acrylate rubbers, ethylene-acrylate rubbers, ethylene-acrylic acid rubbers or ethylene-vinyl acetate rubbers and also their partially hydrolyzed derivatives, thermoplastic elastomeric polyurethanes, sulfonated polyethylenes or thermoplastic elastomeric polyesters. In the formulae, R$^1$ and—if present—R$^2$ are different or preferably the same and are each selected from organic groups and in particular C$_1$-C$_6$-alkyl.

One embodiment of the present invention comprises using binders having both ethylenically unsaturated groups and functional groups. Examples comprise addition-crosslinking silicone elastomers having functional groups and ethylenically unsaturated groups, copolymers of butadiene with (meth)acrylates, (meth)acrylic acid or acrylonitrile, and also copolymers or block copolymers of butadiene or isoprene with styrene derivatives having functional groups, examples being block copolymers of butadiene and 4-hydroxystyrene.

The third group of binders comprises those which have neither ethylenically unsaturated groups nor functional groups. There may be mentioned for example polyolefins or ethylene-propylene elastomers or products obtained by hydrogenation of diene units, for example SEBS rubbers.

Polymer layers comprising binders without ethylenically unsaturated or functional groups generally have to be amplified mechanically, with the aid of high-energy radiation or a combination thereof in order to permit optimum crisp structurability via laser.

It is also possible to use mixtures of two or more binders, in which case the two or more binders in any one mixture may all just come from one of the groups described or may come from two or all three groups. The possible combinations are only limited insofar as the suitability of the polymer layer for the laser-structuring operation and the negative-molding operation must not be adversely affected. It may be advantageous to use for example a mixture of at least one elastomeric binder having no functional groups with at least one further binder having functional groups or ethylenically unsaturated groups.

In one embodiment of the present invention, the proportion of binder or binders in the elastomeric layer or the particular laser-engravable layer is in the range from 30% by weight to 99% by weight based on the sum total of all the constituents of the particular elastomeric layer or the particular laser-engravable layer, preferably in the range from 40% to 95% by weight and most preferably in the range from 50% to 90% by weight.

In one embodiment of the present invention, polyurethane layer (C) is formed with the aid of a silicone mold. Silicone molds herein are molds prepared using at least one binder having at least one and preferably at least three O—Si(R$^1$R$^2$)—O—groups per molecule, where the variables are each as defined above.

Optionally, the elastomeric layer or laser-engravable layer may comprise reactive low molecular weight or oligomeric compounds. Oligomeric compounds generally have a molecular weight of not more than 20 000 g/mol. Reactive low molecular weight and oligomeric compounds are hereinbelow simply referred to as monomers.

Monomers may be added to increase the rate of photochemical or thermochemical crosslinking or of crosslinking via high-energy radiation, if desired. When binders from the first and second groups are used, the addition of monomers for acceleration is generally not absolutely essential. In the case of binders from the third group, the addition of monomers is generally advisable without being absolutely essential in every case.

Irrespective of the issue of crosslinking rate, monomers can also be used for controlling crosslink density. Depending on the identity and amount of low molecular weight compounds added, wider or narrower networks are obtained. Known ethylenically unsaturated monomers can be used first of all. The monomers should be substantially compatible with the binders and have at least one photochemically or thermochemically reactive group. They should not be volatile. Preferably, the boiling point of suitable monomers is at least 150° C. Of particular suitability are amides of acrylic acid or methacrylic acid with mono- or polyfunctional alcohols, amines, aminoalcohols or hydroxy ethers and hydroxy esters, styrene or substituted styrenes, esters of fumaric or maleic acid, or allyl compounds. Examples comprise n-butyl acrylate, 2-ethylhexyl acrylate, lauryl acrylate, 1,4-butanediol di(meth)acrylate, 1,6-hexanediol diacrylate, 1,6-hexanediol dimethacrylate, 1,9-nonanediol diacrylate, trimethylolpropane trimethacrylate, trimethylolpropane triacrylate, dipropylene glycol diacrylate, tripropylene glycol diacrylate, dioctyl fumarate, N-dodecylmaleimide and triallyl isocyanurate.

Monomers suitable for thermochemical amplification in particular comprise reactive low molecular weight silicones such as for example cyclic siloxanes, Si—H-functional siloxanes, siloxanes having alkoxy or ester groups, sulfur-containing siloxanes and silanes, dialcohols such as for example 1,4-butanediol, 1,6-hexanediol, 1,8-octanediol, 1,9-nonanediol, diamines such as for example 1,6-hexanediamine, 1,8-octanediamine, aminoalcohols such as for example ethanolamine, diethanolamine, butylethanolamine, dicarboxylic acids such as for example 1,6-hexanedicarboxylic acid, terephthalic acid, maleic acid or fumaric acid.

It is also possible to use monomers having both ethylenically unsaturated groups and functional groups. As examples there may be mentioned ω-hydroxyalkyl (meth)acrylates, such as for example ethylene glycol mono(meth)acrylate, 1,4-butanediol mono(meth)acrylate or 1,6-hexanediol mono(meth)acrylate.

It is of course also possible to use mixtures of different monomers, provided that the properties of the elastomeric layer are not adversely affected by the mixture. In general, the amount of added monomers is in the range from 0% to 40% by weight, based on the amount of all the constituents of the elastomeric layer or of the particular laser-engravable layer, preferably in the range from 1% to 20% by weight.

In one embodiment, one or more monomers may be used together with one or more catalysts. It is thus possible to accelerate silicone molds by addition of one or more acids or via organotin compounds to accelerate step 2) of the providing of the silicone mold. Suitable organotin compounds can be: di-n-butyltin dilaurate, di-n-butyltin dioctanoate, di-n-butyltin di-2-ethylhexanoate, di-n-octyltin di-2-ethylhexanoate and di-n-butylbis(1-oxoneodecyloxy)stannane.

The elastomeric layer or the laser-engravable layer may further comprise additive and auxiliary materials such as for example IR absorbers, dyes, dispersants, antistats, plasticizers or abrasive particles. The amount of such additive and auxiliary materials should generally not exceed 30% by weight, based on the amount of all the components of the elastomeric layer or of the particular laser-engravable layer.

The elastomeric layer or the laser-engravable layer may be constructed from a plurality of individual layers. These individual layers may be of the same material composition, of substantially the same material Composition or of differing material composition. The thickness of the laser-engravable layer or of all individual layers together is generally between 0.1 and 10 mm and preferably in the range from 0.5 to 3 mm. The thickness can be suitably chosen depending on use-related and machine-related processing parameters of the laser-engraving operation and of the negative molding operation.

The elastomeric layer or the laser-engravable layer may optionally further comprise a top layer having a thickness of not more than 300 µm. The composition of such a top layer is chooseable with regard to optimum engravability and mechanical stability, while the composition of the layer underneath is chosen with regard to optimum hardness or elasticity.

In one embodiment of the present invention, the top layer itself is laser-engravable or removable in the course of the laser-engraving operation together with the layer underneath. The top layer comprises at least one binder. It may further comprise an absorber for laser radiation or else monomers or auxiliaries.

In one embodiment of the present invention, the silicone mold comprises a silicone mold structured with the aid of laser engraving.

In one embodiment of the present invention, the mold comprises a silicone strip sufficiently long for the steps of the inventive process to be carried out on this silicone strip.

It is very particularly advantageous for the process according to the present invention to utilize thermoplastic elastomeric binders or silicone elastomers. When thermoplastic elastomeric binders are used, production is preferably effected by extrusion between a support film/sheet and a cover film/sheet or a cover element followed by calendering, as disclosed in EP-A 0 084 851 for flexographic printing elements for example. Even comparatively thick layers can be produced in a single operation in this way. Multilayered elements can be produced by coextrusion.

To structure a medium with the aid of laser engraving, it is preferable to amplify the corresponding laser-engravable layer before the laser-engraving operation by heating (thermochemically), by exposure to UV light (photochemically) or by exposure to high-energy radiation (actinically) or any desired combination thereof.

Thereafter, the laser-engravable layer or the layer composite is applied to a cylindrical (temporary) support, for example of plastic, glass fiber-reinforced plastic, metal or foam, for example by means of adhesive tape, reduced pressure, clamping devices or magnetic force, and engraved as described above. Alternatively, the planar layer or the layer composite can also be engraved as described above. Optionally, the laser-engravable layer is washed using a rotary cylindrical washer or a continuous washer with a cleaning agent for removing engraving residues during the laser-engraving operation.

The mold can be produced in the manner described as a negative mold or as a positive mold.

In a first variant, the mold has a negative structure, so that the coating which is bondable to backing material (A) is obtainable directly by application of a liquid plastics material to the surface of the mold and subsequent solidification of the polyurethane.

In a second variant, the mold has a positive structure, so that initially a negative mold is produced from the laser-structured positive mold. The coating bondable to a sheetlike support can then be obtained from this negative mold by application of a liquid plastics material to the surface of the negative mold and subsequent solidification of the plastics material.

Preferably, structure elements having dimensions in the range from 10 to 500 µm are engraved into the structured medium. The structure elements may be in the form of elevations or depressions. Preferably, the structure elements have a simple geometric shape and are for example circles, ellipses, squares, rhombuses, triangles and stars. The structure elements may form a regular or irregular screen. Examples are a classic dot screen or a stochastic screen, for example a frequency-modulated screen.

In one embodiment of the present invention, the mold is structured using a laser to cut wells into the mold which have an average depth in the range from 50 to 250 µm and a center-to-center spacing in the range from 50 to 250 µm.

For example, the mold can be engraved such that it has wells (depressions) having a diameter in the range from 10 to 500 µm at the surface of the mold. The diameter at the surface of the mold is preferably in the range from 20 to 250 µm and more preferably 30-150 µm. The spacing of the wells can be for example in the range from 10 to 500 µm, preferably in the range from 20 to 200 µm and more preferably up to 80 µm.

In one embodiment of the present invention, the mold preferably has a surface fine structure as well as a surface coarse structure. Both coarse structure and fine structure can be produced by laser engraving. The fine structure can be for example a microroughness having a roughness amplitude in the range from 1 to 30 µm and a roughness frequency in the range from 0.5 to 30 µm. The dimensions of the microroughness are preferably in the range from 1 to 20 µm, more preferably in the range from 2 to 15 µm and more preferably in the range from 3 to 10 µm.

IR lasers in particular, for example $CO_2$ lasers, are suitable for laser engraving. However, it is also possible to use lasers having shorter wavelengths, provided the laser is of sufficient intensity. For example, a frequency-doubled (532 nm) or frequency-tripled (355 nm) Nd-YAG laser can be used, or else an excimer laser (248 nm for example). The laser-engraving operation may utilize for example a $CO_2$ laser having a wavelength of 10 640 nm. It is particularly preferable to use lasers having a wavelength in the range from 600 to 2000 nm. Nd-YAG lasers (1064 nm), IR diode lasers or solid-state lasers can be used for example. Nd/YAG lasers are particularly preferred. The image information to be engraved is transferred directly from the lay-out computer system to the laser apparatus. The lasers can be operated either continuously or in a pulsed mode.

In many cases, the structured medium obtained can be used directly as produced. If desired, the structured medium obtained can additionally be cleaned. Such a cleaning step removes loosened but possibly still not completely detached layer constituents from the surface. In general, simply treating with water, water/surfactant, alcohols or inert organic cleaning agents which are preferably low-swelling will be sufficient.

The mold is transferred into an apparatus in which the inventive process is to be carried out. The apparatus comprises one or more means for
    applying, in particular spraying, preferably aqueous polyurethane dispersion onto the mold,
    applying if appropriate material which converts into a bonding layer (B) by curing, onto a polyurethane layer (C) and/or backing material (A), transferring to polyurethane layer (C) backing material (A) provided if appropriate with a material which converts to bonding layer (B), fixing backing material (A), material which converts to a bonding layer (B) and polyurethane layer (C) together, for example thermally, by actinic radiation or by pressure or by a combination of at least two thereof, and/or detaching the multilayered composite articles thus produced.

In a further step, an aqueous formulation of polyurethane is applied to the mold. The applying may preferably be effected by spraying. The mold should have been heated when the formulation of polyurethane is applied, for example to temperatures of at least 80° C., preferably at least 90° C. The water from the preferably aqueous formulation of polyurethane evaporates preferably abruptly, in particular faster than within 5 seconds, most preferably by the next operation, and can promote or cause the formation of capillaries in the solidifying polyurethane layer.

Aqueous in connection with the polyurethane dispersion is to be understood as meaning that the polyurethane dispersion comprises water, but less than 5% by weight, based on the dispersion, preferably less than 1% by weight of organic solvent. It is particularly preferable for there to be no detectable volatile organic solvent. Volatile organic solvents herein are such organic solvents as have a boiling point of up to 200° C. at standard pressure.

The aqueous polyurethane dispersion can have a solids content in the range from 5% to 60% by weight, preferably in the range from 10% to 50% by weight and more preferably in the range from 25% to 45% by weight.

Polyurethanes (PU) are common general knowledge, commercially available and consist in general of a soft phase of comparatively high molecular weight polyhydroxy compounds, for example of polycarbonate, polyester or polyether segments, and a urethane hard phase formed from low molecular weight chain extenders and di- or polyisocyanates.

Processes for preparing polyurethanes (PU) are common general knowledge. In general, polyurethanes (PU) are prepared by reaction of (a) isocyanates, preferably diisocyanates, with
(b) isocyanate-reactive compounds, typically having a molecular weight ($M_w$) in the range from 500 to 10 000 g/mol, preferably in the range from 500 to 5000 g/mol and more preferably in the range from 800 to 3000 g/mol, and
(c) chain extenders having a molecular weight in the range from 50 to 499 g/mol if appropriate in the presence of
(d) catalysts
(e) and/or customary additive materials.

In what follows, the starting components and processes for preparing the preferred polyurethanes (PU) will be described by way of example. The components (a), (b), (c) and also if appropriate (d) and/or (e) customarily used in the preparation of polyurethanes (PU) will now be described by way of example:

As isocyanates (a) there may be used commonly known aliphatic, cycloaliphatic, araliphatic and/or aromatic isocyanates, examples being tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-tolylene diisocyanate (TDI), diphenylmethane diisocyanate, 3,3'-dimethylbiphenyl diisocyanate, 1,2-diphenylethane diisocyanate and/or phenylene diisocyanate. Preference is given to using 4,4'-MDI. Preference is also given to aliphatic diisocyanates, in particular hexamethylene diisocyanate (HDI), and particular preference is given to aromatic diisocyanates such as 2,2'-, 2,4'- and/or 4,4'-diphenyl-methane diisocyanate (MDI) and mixtures of the aforementioned isomers.

As isocyanate-reactive compounds (b) there may be used the commonly known isocyanate-reactive compounds, examples being polyesterols, polyetherols and/or polycarbonate diols, which are customarily also subsumed under the term "polyols", having molecular weights ($M_w$) in the range of 500 and 8000 g/mol, preferably in the range from 600 to 6000 g/mol, in particular in the range from 800 to 3000 g/mol, and preferably an average functionality of 1.8 to 2.3, preferably 1.9 to 2.2, in particular 2, with regard to isocyanates. Preference is given to using polyether polyols, for example those based on commonly known starter substances and customary alkylene oxides, for example ethylene oxide, 1,2-propylene oxide and/or 1,2-butylene oxide, preferably polyetherols based on polyoxytetramethylene (poly-THF), 1,2-propylene oxide and ethylene oxide. Polyetherols have the advantage of having a higher hydrolysis stability than polyesterols, and are preferably used as component (b), in particular for preparing soft polyurethanes polyurethane (PU1).

As polycarbonate diols there may be mentioned in particular aliphatic polycarbonate diols, for example 1,4-butanediol polycarbonate and 1,6-hexanediol polycarbonate.

As polyester diols there are to be mentioned those obtainable by polycondensation of at least one primary diol, preferably at least one primary aliphatic diol, for example ethylene glycol, 1,4-butanediol, 1,6-hexanediol, neopentyl glycol or more preferably 1,4-dihydroxymethylcyclohexane (as isomer mixture) or mixtures of at least two of the aforementioned diols, and at least one, preferably at least two dicarboxylic acids or their anhydrides. Preferred dicarboxylic acids are aliphatic dicarboxylic acids such as adipic acid, glutaric acid, succinic acid and aromatic dicarboxylic acids such as for example phthalic acid and particularly isophthalic acid.

Polyetherols are preferably prepared by addition of alkylene oxides, in particular ethylene oxide, propylene oxide and mixtures thereof, onto diols such as for example ethylene glycol, 1,2-propylene glycol, 1,2-butylene glycol, 1,4-butanediol, 1,3-propanediol, or onto triols such as for example glycerol, in the presence of high-activity catalysts. Such high-activity catalysts are for example cesium hydroxide and dimetal cyanide catalysts, also known as DMC catalysts. Zinc hexacyanocobaltate is a frequently employed DMC catalyst. The DMC catalyst can be left in the polyetherol after the reaction, but preferably it is removed, for example by sedimentation or filtration.

Mixtures of various polyols can be used instead of just one polyol.

To improve dispersibility, isocyanate-reactive compounds (b) may also include a proportion of one or more diols or diamines having a carboxylic acid group or sulfonic acid group (b'), in particular alkali metal or ammonium salts of 1,1-dimethylolbutanoic acid, 1,1-dimethylolpropionic acid or

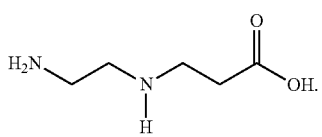

Useful chain extenders (c) include commonly known aliphatic, araliphatic, aromatic and/or cycloaliphatic compounds having a molecular weight in the range from 50 to 499 g/mol and at least two functional groups, preferably compounds having exactly two functional groups per molecule, examples being diamines and/or alkanediols having 2 to 10 carbon atoms in the alkylene radical, in particular 1,3-propanediol, 1,4-butanediol, 1,6-hexanediol and/or di-, tri-, tetra-, penta-, hexa-, hepta-, octa-, nona- and/or decaalkylene glycols having 3 to 8 carbon atoms per molecule, preferably the corresponding oligo- and/or polypropylene glycols, and mixtures of chain extenders (c) can also be used.

It is particularly preferable for components (a) to (c) to comprise difunctional compounds, i.e., diisocyanates (a), difunctional polyols, preferably polyetherols (b) and difunctional chain extenders, preferably diols.

Useful catalysts (d) to speed in particular the reaction between the NCO groups of the diisocyanates (a) and the hydroxyl groups of the building block components (b) and (c) are customary tertiary amines, for example triethylamine, dimethylcyclohexylamine, N-methylmorpholine, N,N'-dimethylpiperazine, 2-(dimethylaminoethoxy)ethanol, diazabicyclo[2.2.2]octane (DABCO) and similar tertiary amines, and also in particular organic metal compounds such as titanic esters, iron compounds such as for example iron(III) acetylacetonate, tin compounds, for example tin diacetate, tin dioctoate, tin dilaurate or the tin dialkyl salts of aliphatic carboxylic acids such as dibutyltin diacetate, dibutyltin dilaurate or the like. The catalysts are typically used in amounts of 0.0001 to 0.1 part by weight per 100 parts by weight of component (b).

As well as catalyst (d), auxiliaries and/or additives (e) can also be added to the components (a) to (c). There may be mentioned for example blowing agents, antiblocking agents, surface-active substances, fillers, for example fillers based on nanoparticles, in particular fillers based on $CaCO_3$, nucleators, glidants, dyes and pigments, antioxidants, for example against hydrolysis, light, heat or discoloration, inorganic and/or organic fillers, reinforcing agents and plasticizers, metal deactivators. In a preferred embodiment, component (e) also includes hydrolysis stabilizers such as for example polymeric and low molecular carbodiimides. The soft polyurethane preferably comprises triazole and/or triazole derivative and antioxidants in an amount of 0.1% to 5% by weight based on the total weight of the soft polyurethane in question. Useful antioxidants are generally substances that inhibit or prevent unwanted oxidative processes in the plastics material to be protected. In general, antioxidants are commercially available. Examples of antioxidants are sterically hindered phenols, aromatic amines, thiosynergists, organophosphorus compounds of trivalent phosphorus and hindered amine light stabilizers. Examples of sterically hindered phenols are to be found in Plastics Additive Handbook, 5th edition, H. Zweifel, ed., Hanser Publishers, Munich, 2001 ([1]), pages 98-107 and page 116-page 121. Examples of aromatic amines are to be found in [1], pages 107-108. Examples of thiosynergists are given in [1], pages 104-105 and pages 112-113. Examples of phosphites are to be found in [1], pages 109-112. Examples of hindered amine light stabilizers are given in [1], pages 123-136. Phenolic antioxidants are preferred for use in the antioxidant mixture. In a preferred embodiment, the antioxidants, in particular the phenolic antioxidants, have a molar mass of greater than 350 g/mol, more preferably greater than 700 g/mol and a maximum molar mass ($M_w$) of not more than 10 000 g/mol, preferably up to not more than 3000 g/mol. They further preferably have a melting point of not more than 180° C. It is further preferable to use antioxidants that are amorphous or liquid. Mixtures of two or more antioxidants can likewise be used as component (e).

As well as the specified components (a), (b) and (c) and if appropriate (d) and (e), chain regulators (chain-terminating agents), customarily having a molecular weight of 31 to 3000 g/mol, can also be used. Such chain regulators are compounds which have only one isocyanate-reactive functional group, examples being monofunctional alcohols, monofunctional amines and/or monofunctional polyols. Such chain regulators make it possible to adjust flow behavior, in particular in the case of soft polyurethanes, to specific values. Chain regulators can generally be used in an amount of 0 to 5 parts and preferably 0.1 to 1 part by weight, based on 100 parts by weight of component (b), and by definition come within component (c).

As well as the specified components (a), (b) and (c) and if appropriate (d) and (e), it is also possible to use crosslinkers having two or more isocyanate-reactive groups toward the end of the polyurethane-forming reaction, for example hydrazine hydrate.

To adjust the hardness of polyurethane (PU), the components (b) and (c) can be chosen within relatively wide molar ratios. Useful are molar ratios of component (b) to total chain extenders (c) in the range from 10:1 to 1:10, and in particular in the range from 1:1 to 1:4, the hardness of the soft polyurethanes increasing with increasing (c) content. The reaction to produce polyurethane (PU) can be carried out at an index in the range from 0.8 to 1.4:1, preferably at an index in the range from 0.9 to 1.2:1 and more preferably at an index in the range from 1.05 to 1.2:1. The index is defined by the ratio of all the isocyanate groups of component (a) used in the reaction to the isocyanate-reactive groups, i.e., the active hydrogens, of components (b) and if appropriate (c) and if appropriate monofunctional isocyanate-reactive components as chain-terminating agents such as monoalcohols for example.

Polyurethane (PU) can be prepared by conventional processes in a continuous manner, for example by the one-shot or the prepolymer process, or batchwise by the conventional prepolymer operation. In these processes, the reactant components (a), (b), (c) and if appropriate (d) and/or (e) can be mixed in succession or simultaneously, and the reaction ensues immediately.

Polyurethane (PU) can be dispersed in water in a conventional manner, for example by dissolving polyurethane (PU) in acetone or preparing it as a solution in acetone, admixing the solution with water and then removing the acetone, for example distillatively. In one variant, polyurethane (PU) is prepared as a solution in N-methylpyrrolidone or N-ethylpyrrolidone, admixed with water and the N-methylpyrrolidone or N-ethylpyrrolidone is removed.

In one embodiment of the present invention, aqueous dispersions of the present invention comprise two different polyurethanes polyurethane (PU1) and polyurethane (PU2), of which polyurethane (PU1) is a so-called soft polyurethane which is constructed as described above for polyurethane (PU), and at least one hard polyurethane (PU2).

Hard polyurethane (PU2) can in principle be prepared similarly to soft polyurethane (PU1), but other isocyanate-reactive compounds (b) or other mixtures of isocyanate-reactive compounds (b), herein also referred to as isocyanate-reactive compounds (b2) or in short compound (b2), are chosen.

Examples of compounds (b2) are in particular 1,4-butanediol, 1,6-hexanediol and neopentyl glycol, either mixed with each other or mixed with polyethylene glycol.

In one version of the present invention, diisocyanate (a) and polyurethane (PU2) are each mixtures of diisocyanates, for example mixtures of HDI and IPDI, larger proportions of IPDI being chosen for the preparation of hard polyurethane (PU2) than for the preparation of soft polyurethane (PU1).

In one embodiment of the present invention, polyurethane (PU2) has a Shore A hardness in the range from above 60 to not more than 100, the Shore A hardness being determined in accordance with German standard specification DIN 53505 after 3 s.

In one embodiment of the present invention, polyurethane (PU) has an average particle diameter in the range from 100 to 300 nm and preferably in the range from 120 to 150 nm, determined by laser light scattering.

In one embodiment of the present invention, soft polyurethane (PU1) has an average particle diameter in the range from 100 to 300 nm and preferably in the range from 120 to 150 nm, determined by laser light scattering.

In one embodiment of the present invention, polyurethane (PU2) has an average particle diameter in the range from 100 to 300 nm and preferably in the range from 120 to 150 nm, determined by laser light scattering.

The aqueous polyurethane dispersion may further comprise at least one curative, which may also be referred to as a crosslinker. Compounds are useful as a curative which are capable of crosslinking a plurality of polyurethane molecules together, for example on thermal activation. Of particular suitability are crosslinkers based on trimeric diisocyanates, in particular based on aliphatic diisocyanates such as hexamethylene diisocyanate. Very particular preference is given to crosslinkers of formula I a or I b, herein also referred to in brief as compound (V)

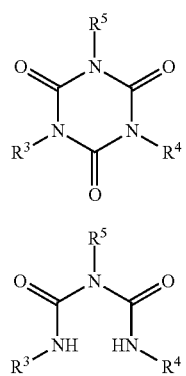

where $R^3$, $R^4$ and $R^5$ may be different or preferably the same and are each selected from $A^1$—NCO and $A^1$—NH—CO—X, where $A^1$ is a spacer having 2 to 20 carbon atoms, selected from arylene, unsubstituted or substituted with one to four $C_1$-$C_4$-alkyl groups, alkylene and cycloalkylene, for example 1,4-cyclohexylene. Preferred spacers Al are phenylene, in particular para-phenylene, also tolylene, in particular para-tolylene, and $C_2$-$C_{12}$-alkylene such as for example ethylene (CH2CH2), also —(CH2)$_3$—, —(CH$_2$)$_4$—, —(CH$_2$)$_5$—, —(CH$_2$)$_6$—, —(CH$_2$)$_8$—, —(CH$_2$)$_{10}$—, —(CH$_2$)$_{12}$—.

X is selected from $O(AO)_xR^6$, where

AO is $C_2$-$C_4$-alkylene oxide, for example butylene oxide, in particular ethylene oxide (CH2CH$_2$O) or propylene oxide (CH(CH$_3$)CH$_2$O) or (CH$_2$CH(CH$_3$)O), x is an integer from 1 to 50, preferably 5 to 25, and $R^6$ is selected from hydrogen and $C_1$-$C_{30}$-alkyl, in particular $C_1$-$C_{10}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, more preferably $C_1$-$C_4$-alkyl such as methyl, ethyl, n-propyl, isopropyl, n-butyl, isobutyl, sec-butyl and tert-butyl.

Particularly preferred compounds (V) are those wherein $R^3$, $R^4$ and $R^5$ are each the same (CH$_2$)$_4$—NCO, (CH$_2$)$_6$—NCO or (CH$_2$)$_{12}$—NCO.

Aqueous polyurethane dispersions may comprise further constituents, for example (f) a silicone compound having reactive groups, herein also referred to as silicone compound (f).

Examples of reactive groups in connection with silicone compounds (f) are for example carboxylic acid groups, carboxylic acid derivatives such as for example methyl carboxylate or carboxylic anhydrides, in particular succinic anhydride groups, and more preferably carboxylic acid groups.

Examples of reactive groups further include primary and secondary amino groups, for example NH(iso-$C_3$H$_7$) groups, NH(n-$C_3$H$_7$) groups, NH(cyclo-$C_6$H$_{11}$) groups and NH(n-$C_4$H$_9$) groups, in particular NH($C_2$H$_5$) groups and NH(CH$_3$) groups, and most preferably NH$_2$ groups.

Preference is further given to aminoalkylamino groups such as for example —NH—CH$_2$—CH$_2$—NH$_2$ groups, —NH—CH$_2$—CH$_2$—CH$_2$—NH$_2$ groups, —NH—CH$_2$—CH$_2$—NH($C_2$H$_5$) groups, —NH—CH$_2$—CH$_2$—CH$_2$—NH($C_2$H$_5$) groups, —NH—CH$_2$—CH$_2$—NH(CH$_3$) groups, —NH—CH$_2$—CH$_2$—CH$_2$—NH(CH3) groups.

The reactive group or groups are attached to silicone compound (f) either directly or preferably via a spacer $A^2$. $A^2$ is selected from arylene, unsubstituted or substituted with one to four $C_1$-$C_4$-alkyl groups, alkylene and cycloalkylene such as for example 1,4-cyclohexylene. Preferred spacers $A^2$ are phenylene, in particular para-phenylene, also tolylene, in particular para-tolylene, and $C_2$-$C_{18}$-alkylene such as for example ethylene (CH$_2$CH$_2$), also —(CH$_2$)$_3$—, —(CH$_2$)$_4$—, —(CH$_2$)$_5$—, —(CH$_2$)$_6$—, —(CH$_2$)$_8$—, —(CH$_2$)$_{10}$—, —(CH$_2$)$_{12}$—, —(CH$_2$)$_{14}$—, —(CH$_2$)$_{16}$— and —(CH$_2$)$_{18}$—.

In addition to the reactive groups, silicone compound (f) comprises non-reactive groups, in particular di-$C_1$-$C_{10}$-alkyl-SiO$_2$ groups or phenyl-$C_1$-$C_{10}$-alkyl-SiO$_2$ groups, in particular dimethyl-SiO2 groups, and if appropriate one or more Si(CH$_3$)$_2$-OH groups or Si(CH$_3$)$_3$ groups.

In one embodiment of the present invention, silicone compound (f) has on average one to four reactive groups per molecule.

In an advantageous embodiment of the present invention, silicone compound (f) has on average one to four COOH groups per molecule.

In another advantageous embodiment of the present invention, silicone compound (f) has on average one to four amino groups or aminoalkylamino groups per molecule.

Silicone compound (f) comprises Si—O—Si units in a chain-shaped or branched arrangement.

In one embodiment of the present invention, silicone compound (f) has a molecular weight $M_n$, in the range from 500 to 10 000 g/mol, preferably up to 5000 g/mol.

When silicone compound (f) has two or more reactive groups per molecule, these reactive groups can be attached— directly or via spacer $A^2$—to the Si—O—Si chain via two or more silicon atoms or pairwise via the same silicon atom.

The reactive group or groups may be attached to one or more of the terminal silicon atoms of silicone compound (f)—directly or via spacer $A^2$. In another embodiment of the present invention, the reactive group or groups are attached to one or more of the non-terminal silicon atoms of silicone compound (f)—directly or via spacer $A^2$.

In one embodiment of the present invention, aqueous polyurethane dispersion further comprises a polydi-$C_1$-$C_4$-alkylsiloxane (g) having neither amino groups nor COOH groups, preferably a polydimethylsiloxane, herein also referred to in brief as polydialkylsiloxane (g) or polydimethylsiloxane (g).

The $C_1$-$C_4$-alkyl in polydialkylsiloxane (g) may be different or preferably the same and selected from methyl, ethyl, n-propyl, isopropyl, n-butyl, isobutyl, sec-butyl and tert-butyl, of which unbranched $C_1$-$C_4$-alkyl is preferred and methyl is particularly preferred.

Polydialkylsiloxane (g) and preferably polydimethylsiloxane (g) preferably comprises unbranched polysiloxanes having Si—O—Si chains or such polysiloxanes as have up to 3 and preferably not more than one branching per molecule.

Polydialkylsiloxane (D) and in particular polydimethylsiloxane (g) may have one or more $Si(C_1$-$C_4$-alkyl$)_2$—OH groups.

In one embodiment of the present invention, aqueous polyurethane dispersion comprises altogether from 20% to 30% by weight of polyurethane (PU), or altogether from 20% to 30% by weight of polyurethanes (PU1) and (PU2), from 1% to 10%, preferably 2% to 5% by weight of curative, from 1% to 10% by weight of silicone compound (f), from zero to 10%, preferably 0.5% to 5% by weight of polydialkylsiloxane (g).

In one embodiment of the present invention, aqueous polyurethane dispersion comprises from 10% to 30% by weight of soft polyurethane (PU1) and from zero to 20% by weight of hard polyurethane (PU2).

In one embodiment of the present invention, aqueous dispersion of the present invention has a solids content of altogether 5% to 60% by weight, preferably 10% to 50% by weight and more preferably 25% to 45% by weight.

These weight % ages each apply to the active or solid ingredient and are based on the total aqueous dispersion of the present invention. The remainder ad 100% by weight is preferably continuous phase, for example water or a mixture of one or more organic solvents and water.

In one embodiment of the present invention, aqueous polyurethane dispersion comprises at least one additive (h) selected from pigments, antilusterants, light stabilizers, antistats, antisoil, anticreak, thickening agents, in particular thickening agents based on polyurethanes, and microballoons.

In one embodiment of the present invention, aqueous polyurethane dispersion comprises altogether up to 20% by weight of additives (h).

Aqueous polyurethane dispersion may also comprise one or more organic solvents.

Suitable organic solvents are for example alcohols such as ethanol or isopropanol and in particular glycols, diglycols, triglycols or tetraglycols and doubly or preferably singly $C_1$-$C_4$-alkyl etherified glycols, diglycols, triglycols or tetraglycols. Examples of suitable organic solvents are ethylene glycol, propylene glycol, butylene glycol, diethylene glycol, triethylene glycol, tetraethylene glycol, dipropylene glycol, 1,2-dimethoxyethane, methyltriethylene glycol ("methyltriglycol") and triethylene glycol n-butyl ether ("butyltriglycol").

Aqueous polyurethane dispersions can be produced by mixing polyurethane (PU), curative and silicone compound (f) with water and if appropriate one or more of the aforementioned organic solvents. If desired, polydialkylsiloxane (g) and additives (h) are also mixed in. The mixing can take the form of stirring for example. The order of addition of polyurethane (PU), curative, silicone compound (f) and water and if appropriate one or more of the aforementioned organic solvents and also—if desired—polydialkylsiloxane (g) and additives (h) is freely choosable.

It is preferable to proceed from a polyurethane (PU) dispersed in water or a mixture of water and organic solvent or from dispersed soft polyurethane (PU1) and hard polyurethane (PU2) and adding, preferably with stirring, curative and silicone compound (f) and also, if desired, polydialkylsiloxane (g) and if appropriate one or more organic solvents. Preferably, however, no organic solvent is added.

In an advantageous embodiment, thickening agent as an example of additive (h) is added last to thus adjust the viscosity of the aqueous polyurethane dispersion to the desired value.

In a further operation of the inventive production process, preferably organic adhesive is applied to polyurethane film (C) and/or backing material (A).

In one version, preferably organic adhesive is applied non-uniformly, for example in the form of points, dots or stripes or by spraying.

In another version, preferably organic adhesive is applied uniformly, for example via roller coater or by blade coating.

In one version of the present invention, one preferably organic adhesive is applied to polyurethane film (C) and one preferably organic adhesive is applied to backing material (A), the two adhesives differing, for example by virtue of one or more additives or because they comprise chemically different preferably organic adhesives. Thereafter, polyurethane film (C) and backing material (A) are bonded together such that the layer(s) of adhesive come to reside between polyurethane film (C) and backing material (A). The adhesive or adhesives are cured, for example thermally, by means of actinic radiation or by aging, to obtain multilayered composite material which is in accordance with the present invention.

In a further operation, pressure can be exerted on the conjoined constituents of polyurethane film (C), backing material (A) and bonding layer (B), or material capable of converting to a bonding layer (B), mechanically, for example by pressing. The pressing can take place for example semicontinuously by ram pressing or continuously by roller pressing (calendering).

One embodiment of the present invention comprises pressing with a ram pressure or roller pressure in the range from 1 to 10 bar.

The ram presses or roller presses preferably comprise heated elements. In one embodiment, the pressing also serves to introduce thermal energy, so that the material which is thermally converted to bonding layer (B) is exposed to a temperature of 75 to 120° C., preferably at least 80° C.

One embodiment of the present invention comprises exerting the pressure for a period in the range from 5 seconds to 5 minutes, preferably in the range from 10 to 30 seconds and most preferably about 20 seconds.

In one embodiment of the present invention, multilayered composite material produced according to the present invention may include no further layers.

In another embodiment of the present invention, multilayered composite material produced according to the present invention may comprise at least one interlayer (D) between backing material (A) and bonding layer (B), between bonding layer (B) and polyurethane layer (C) or between two bonding layers (B), which can be the same or different. Interlayer (D) is selected from textile, paper, non-wovens, and non-wovens composed of synthetic materials such as polypropylene or polyurethane, in particular non-wovens composed of thermoplastic polyurethane. The material of interlayer (D) is so chosen as to differ from backing material (A).

In the embodiments in which multilayered composite material produced according to the present invention includes at least one interlayer (D), polyurethane layer (C) is preferably in direct contact not with backing material (A) but with interlayer (D).

In one embodiment of the present invention, interlayer (D) can have a median diameter (thickness) in the range from 0.05 mm to 5 cm, preferably 0.1 mm to 0.5 cm, more preferably 0.2 mm to 2 mm.

Preferably, interlayer (D) has a water vapor transmission rate in the range greater than 1.5 mg/cm$^2$·h, measured to German standard specification DIN 53333.

In one embodiment of the present invention, an interlayer (D) is placed between backing material (A) and bonding layer (B), between bonding layer (B) and polyurethane layer (C), or between two bonding layers (B).

Interlayer (D) is as defined above.

The placing can be done manually or mechanically, continuously or batchwise.

Multilayered composite materials produced according to the present invention have a high mechanical strength and fastnesses. They further have a high water vapor permeability. Drops of spilt liquid are easy to remove, for example with a cloth. Multilayered composite materials of the present invention also have an appealing appearance and a very pleasant soft hand or feel.

The use of multilayered composite material produced according to the present invention is for example advantageous in the interiors of vehicles, for example in roof liners, dashboards, seats, grips, steering wheels, interior trim and center consoles. Multilayered composite materials produced according to the present invention are further useful for packaging materials, for example ornamental or decorative packaging, and also for decorative materials. Also advantageous is use for apparel pieces such as coats or jackets or footwear.

In one embodiment of the present invention, multilayered composite materials produced according to the present invention are advantageously used in costly printed products such as brochures, pamphlets, leaflets, prospectuses, catalogs, in particular in annual reports and in books, for example in book covers.

Multilayered composite layers produced according to the present invention can further be used with advantage in interior design, for example for laminating furniture.

The present invention further provides apparatus suitable for carrying out the process of the present invention. Apparatus of the present invention comprise in one embodiment a mold, preferably a silicone mold, which comprises a heat transfer medium having a heat capacity in the range from 100 to 20 000 J/K·m$^2$, on at least two rollers which they are mounted such that they are able to turn the mold in an endless loop, at least one applicator whereby preferably aqueous polyurethane dispersion can be applied, preferably sprayed onto the mold, the aqueous polyurethane dispersion forming a polyurethane layer (C), if appropriate at least one applicator with which material which on curing converts into bonding layer (B) can be applied and in particular sprayed on, at least one unit whereby backing material (A) with or without a material capable of forming a bonding layer (B) on curing is transferred onto polyurethane layer (C), a unit which fixes backing material (A), material which converts to bonding layer (B) and polyurethane layer (C) together, for example thermally, via actinic radiation or by pressure or a combination of at least two of the aforementioned methods, a device for detaching the multilayered composite article produced according to the present invention, if appropriate a unit which applies material which can convert to bonding layer (B) onto polyurethane layer (C).

The aforementioned applicator may comprise for example a spray nozzle connected to at least one stock reservoir vessel for formulation of polyurethane.

A unit for fixing backing material (A), material which converts to bonding layer (B) and polyurethane layer (C) together via pressure may comprise at least two counter-rotating rollers.

In one embodiment of the present invention, the mold comprises a silicone strip sufficiently long to be moved past all aforementioned units and devices, so that the steps of the inventive process can be carried out on this silicone strip.

In one embodiment of the present invention, apparatus according to the present invention comprise conventional measuring and control devices.

The present invention further provides for the use of apparatus of the present invention for carrying out the process of the present invention.

The invention claimed is:

1. A process for continuous production of a multilayered composite article, said process comprising:
   producing at least one polyurethane layer (C) with an endless strip mold; and
   fixing said polyurethane layer (C) on at least one backing material (A) with the aid of a material which converts to at least one bonding layer (B),
   wherein the endless strip mold has a temperature in a range from 80 to 170° C. and a heat capacity in a range from 100 to 20 000 J/K·m$^2$, and
   wherein the multilayered composite article comprises
   (A) the at least one backing material,
   (B) the at least one bonding layer, and
   (C) the at least one polyurethane layer which comprises capillaries which pass through an entire thickness of the polyurethane layer.

2. The process according to claim 1, wherein said composite article comprises at least one breathable composite article.

3. The process according to claim 1, wherein the endless strip mold comprises a silicone mold or a silicone-coated material.

4. The process according to claim 1, wherein the endless strip mold comprises a heat transfer medium.

5. The process according to claim 4, wherein the heat transfer medium is at least one selected from the group consisting of a heated metallic body and metallic body having high heat capacity.

6. The process according to claim 4, wherein the heat transfer medium comprises metal integrated in the endless strip mold.

7. The process according to claim 1, wherein said polyurethane layer (C) comprises at least two polyurethanes.

8. The process according to claim 1, wherein said backing material (A) is selected from the group consisting of leather, artificial leather, a metallic foil, a plastics foil, a textile material, and a cellulosic material.

9. The process according to claim 1, wherein at least one interlayer (D) is continuously inserted, and the material of the interlayer (D) is other than said backing material (A).

10. The process according to claim 1, wherein said polyurethane layer (C) is produced with the aid of at least one aqueous formulation of at least one polyurethane.

11. The method of claim 1, carried out on an apparatus comprising:

- an endless strip mold, which together with any heat transfer medium present, has a heat capacity in a range from 100 to 20 000 J/K·m², on at least two rollers which are mounted such that the at least two rollers are able to turn the mold in an endless loop;
- at least one applicator whereby an aqueous polyurethane dispersion can be sprayed onto the endless strip mold, the aqueous polyurethane dispersion forming a polyurethane layer (C);
- at least one unit whereby backing material (A) with or without a material capable of forming a bonding layer (B) on curing is transferred onto polyurethane layer (C);
- a unit which fixes backing material (A), material which forms bonding layer (B) and polyurethane layer (C) together;
- a device which detaches the multilayered composite article produced; and
- optionally, a unit which applies material which can convert to bonding layer (B) onto polyurethane layer (C).

12. The process according to claim 2, wherein the endless strip mold comprises a silicone mold or a silicone-coated material.

13. The process according to claim 2, wherein the endless strip mold comprises a heat transfer medium.

14. The process according to claim 2, wherein said polyurethane layer (C) comprises at least two polyurethanes.

15. The process according to claim 3, wherein said polyurethane layer (C) comprises at least two polyurethanes.

16. The process according to claim 4, wherein said polyurethane layer (C) comprises at least two polyurethanes.

17. The process according to claim 5, wherein said polyurethane layer (C) comprises at least two polyurethanes.

\* \* \* \* \*